(12) United States Patent
Criel et al.

(10) Patent No.: US 8,591,798 B2
(45) Date of Patent: Nov. 26, 2013

(54) METHOD FOR FASTENING AN ACCESORY IN A PLASTIC FUEL TANK

(75) Inventors: Bjorn Criel, Merelbeke (BE); Jules-Joseph Van Schaftingen, Wavre (BE); Pascal De Henau, Maleves-Ste-Marie (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 1017 days.

(21) Appl. No.: 11/658,085

(22) PCT Filed: Jul. 20, 2005

(86) PCT No.: PCT/EP2005/053519
§ 371 (c)(1),
(2), (4) Date: Oct. 4, 2007

(87) PCT Pub. No.: WO2006/008308
PCT Pub. Date: Jan. 26, 2006

(65) Prior Publication Data
US 2008/0164639 A1     Jul. 10, 2008

(30) Foreign Application Priority Data
Jul. 23, 2004 (FR) ................................. 04 08196

(51) Int. Cl.
*B29C 49/20* (2006.01)
*B29C 65/60* (2006.01)

(52) U.S. Cl.
USPC ................. 264/515; 264/545; 220/4.14

(58) Field of Classification Search
USPC ........ 220/562, 4.13, 4.14; 264/523, 242, 249, 264/514, 531, 534, 544, 545; 425/457, 535
See application file for complete search history.

(56) References Cited

U.S. PATENT DOCUMENTS 3,308,225 A * 3/1967 Wells ............................ 264/249
3,785,217 A * 1/1974 Peura ........................... 474/190
(Continued)

FOREIGN PATENT DOCUMENTS

EP     0 103 832     3/1984
EP     0 368 809     5/1990
(Continued)

OTHER PUBLICATIONS

U.S. Appl. No. 11/718,161, filed Apr. 27, 2007, Criel, et al.

(Continued)

*Primary Examiner* — Martin Rogers
(74) *Attorney, Agent, or Firm* — Oblon, Spivak, McClelland, Maier & Neustadt, L.L.P.

(57) ABSTRACT

Method for stake-fastening an accessory (4) into a plastic fuel tank, whereby:—the accessory (4) is equipped with at least one orifice (5) which passes right through the accessory (4); —at least some of the plastic of which the wall of the tank (1) is made is melted; and—some of the molten plastic is forced through the orifice (5) of the accessory without becoming detached from the remainder of the molten plastic; —the protruding molten plastic is given an appropriate shape (8) to obtain a self-formed plastic rivet, and is left to solidify; the size and shape of the orifice (5) and/or of the solidified plastic (8) being such that the accessory (4) is mechanically fastened to the tank by at least some of the solidified plastic (8), the stake-fastening of the accessory (4) occurring at the time of manufacture of the tank (1) through the moulding of a split or at least two-part parison.

10 Claims, 4 Drawing Sheets

(56) References Cited

U.S. PATENT DOCUMENTS

Figure 1:
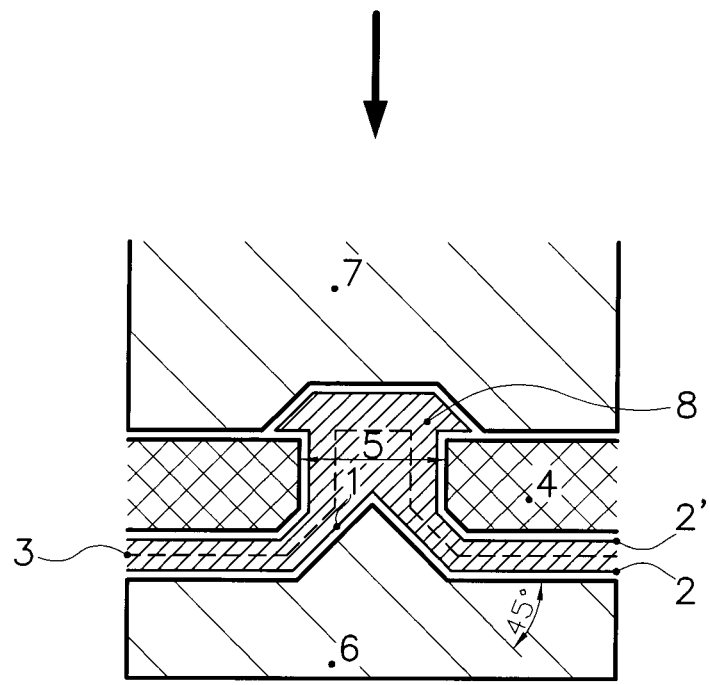

| | | | |
|---|---|---|---|
| 4,116,608 A * | 9/1978 | Uhlig | 425/525 |
| 4,133,860 A * | 1/1979 | Sharp | 264/528 |
| 4,429,208 A * | 1/1984 | Eberle | 219/78.16 |
| 4,891,000 A | 1/1990 | Ishii | |
| 5,308,427 A * | 5/1994 | Duhaime et al. | 156/245 |
| 5,326,514 A | 7/1994 | Linden et al. | |
| 5,445,783 A * | 8/1995 | Irish et al. | 264/515 |
| 6,620,722 B2 * | 9/2003 | Kuo et al. | 438/613 |
| 7,166,253 B2 | 1/2007 | Van Schaftingen et al. | |
| 2001/0015513 A1 * | 8/2001 | Schaftingen et al. | 264/515 |
| 2002/0014572 A1 * | 2/2002 | Albritton | 248/674 |
| 2002/0094414 A1 * | 7/2002 | Wagenblast et al. | 428/139 |

FOREIGN PATENT DOCUMENTS

| | | |
|---|---|---|
| EP | 0 372 507 | 6/1990 |
| EP | 1 110 697 | 6/2001 |
| EP | 1 145 820 | 10/2001 |
| EP | 1 225 032 | 7/2002 |
| EP | 1 261 473 | 12/2002 |
| EP | 1 329 302 | 7/2003 |
| JP | 051333 | 5/1981 |
| JP | 59 120416 | 7/1984 |
| JP | 04 091923 | 3/1992 |
| JP | 09 323360 | 12/1997 |
| WO | 01 60592 | 8/2001 |
| WO | WO 2004/007182 * | 1/2004 |

OTHER PUBLICATIONS

U.S. Appl. No. 11/721,775, filed Jun. 14, 2007, Criel, et al.
U.S. Appl. No. 11/908,336, filed Sep. 11, 2007, Criel, et al.
U.S. Appl. No. 11/993,424, filed Dec. 20, 2007, Criel, et al.
U.S. Appl. No. 11/575,421, filed Mar. 16, 2007, Criel, et al.
U.S. Appl. No. 11/579,494, filed Nov. 3, 2006, Plissart et al.
U.S. Appl. No. 11/721,735, filed Jun. 14, 2007, Mabed, et al.
U.S. Appl. No. 11/721,785, filed Jun. 14, 2007, Criel, et al.

* cited by examiner

METHOD FOR FASTENING AN ACCESORY IN A PLASTIC FUEL TANK

This application is a 371 of PCT/EP2005/053519 filed Jul. 20, 2005.

The present invention relates to a method for fastening an accessory in a plastic fuel tank.

Fuel tanks on board vehicles of various kinds generally have to meet imperviousness and permeability standards in relation to the type of use for which they are designed and the environmental requirements that they have to satisfy. Both in Europe and throughout the world we are currently experiencing a considerable tightening of the requirements concerned with limiting the emissions of pollutants into the atmosphere and into the environment in general. The design of fuel tanks is therefore evolving quickly towards techniques capable of better guaranteeing the imperviousness and safety under varying conditions of use. Furthermore, attempts are also being made to minimize the losses originating from the pipes and various accessories associated with the tanks. One means sometimes used is to incorporate certain accessories and pipe work within the tanks, thus eliminating their interface with the external surroundings. As a preference, these elements are fixed to the internal wall of the tank and do not pass through it, so as to avoid damaging the barrier layer often present in these tanks and so as to eliminate the risk of leakage associated with recourse to sealing devices.

Thus, Patent Application WO 01/60592 in the name of the applicant company discloses a method of manufacturing a plastic fuel tank from two shells formed by moulding, that are assembled, the moulding of at least one shell being performed by compressing part of a sheet of plastic between a mould and a punch and by blowing the remaining part of the sheet in the region not compressed. The advantage of this method is that it allows one or more accessories easily to be included inside the tank, preferably by welding onto the internal face of the tank, for the permeability reasons mentioned hereinbelow. This fastening technique is simple but, unfortunately, limited to accessories having at least part of their basic surface made of the same plastic as the tank (generally HDPE) or, at least, of a plastic compatible therewith. Now, numerous accessories are based either on a metal or on a plastic different from that of the tank, having improved rigidity, improved dimensional stability and improved impermeability to hydrocarbons, such as polyacetal (and, in particular, polyoxymethylene or POM), polyamide, possibly glass-fiber-reinforced polyamide, polybutylene terephthalate (PBT) etc. An alternative fastening technique proposed in this patent application consists in at least partially coating the accessory with part of the sheet at the time of its moulding. However, such a practice uses up a great deal of material and sometimes requires significant modifications to be made to the accessory. Furthermore, this technique may generate deformations and internal tensions as the skin of the tank cools.

It is therefore an object of the invention to provide a method that allows an accessory based on a material different from that of the tank to be fastened inside a plastic fuel tank, and fastened quickly, easily, without consuming excessive amounts of material and without the risk of damaging the barrier layer or of creating excessive internal tensions.

The invention is based on the idea of benefiting from the fact that a parison is melted during its moulding, and that it can be opened up (i.e. split or made up of two independent parts that can be parted from one another) so that an accessory can be stake-fastened in it. This fastening technique is used in application U.S. Pat. No. 5,308,427, but in order to fasten an accessory in an existing (already manufactured) fuel tank that has to be locally heated (using hot gas or the injection of molten material). As the fastening occurs after production, it is not possible to benefit from a local flux of material. In consequence, that technique requires an external addition of material, with the inherent risks of non-homogeneity. Furthermore, in the case of a multilayer tank (typically, made of high density polyethylene (HDPE)) with a layer of EVOH (a copolymer of ethylene and partially hydrolysed vinyl acetate), it is necessary to be careful not to damage the continuity of the barrier layer. It is therefore necessary to melt through the entire thickness locally. This heating step is lengthy and consumes power and furthermore gives rise to deformation and local tensions.

The invention therefore relates to a method for stake-fastening an accessory in a plastic fuel tank, whereby:
the accessory is equipped with at least one orifice which passes right through the accessory;
at least some of the plastic of which the wall of the tank is made is melted; and
some of the molten plastic is forced through the orifice of the accessory without becoming detached from the remainder of the molten plastic;
the protruding molten plastic is given an appropriate shape to obtain a self-formed plastic rivet, and is left to solidify;
the size and shape of the orifice and/or of the solidified plastic being such that the accessory is mechanically fastened to the tank by at least some of the solidified plastic, the stake-fastening of the accessory occurring at the time of manufacture of the tank through the moulding of a split or at least two-part parison.

The term "fuel tank" is intended to denote a sealed tank able to store fuel under diverse and varying environmental and usage conditions. An example of this tank is a tank fitted to motor vehicles.

The fuel tank produced according to the method according to the invention is made of plastic, that is to say of a material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, non-limitingly, random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10° Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, salts and other inorganic derivatives, natural fibers or polymeric fibers. It is also possible to use multilayer structures consisting of stacked layers bonded together comprising at least one of the polymers or copolymers described above.

One polymer which is often used is polyethylene. Excellent results have been obtained with high density polyethylene (HDPE). As a preference, the tank also comprises a layer of a resin impermeable to the fuel, such as EVOH for example (a copolymer of ethylene and partially hydrolysed vinyl acetate). Alternatively, it may be subjected to a surface treatment (fluoration or sulphonation) the purpose of which is to render it impermeable to the fuel.

An "accessory" is intended to denote:
  any object or functional device generally associated with the fuel tank in its conventional mode of use or of operation and which collaborates therewith in order to perform certain useful functions; or
  a support for one or several of such devices.

Non-limiting examples of such devices are: liquid pumps, level gauges, pipettes, tanks or baffles internal to the fuel tank, ventilation devices, electronic units and stiffening bars.

According to one advantageous embodiment of the method according to the invention, the accessory is in actual fact a preassembled structure comprising a support and one or several identical or different devices which are fixed by any suitable fastening means. Examples of these means are clipping, screw-fastening, welding, etc. It is also advantageous for the preassembled structure to bear means that allow additional devices that may be added on later to be attached. These means are also clipping devices, tapped holes or threaded protrusions of circular shape to allow screwing, surface regions suited to welding, etc. In the same vein, the accessory may consist of a simple support comprising suitable means for the later attachment of one or more devices. In other words, as a preference, the accessory comprises a support which is either equipped with fastening means for one or several functional devices of the fuel tank (and which may be the lid of the accessory), or bears one or several such devices directly. In this case, the orifice used for stake-fastening the accessory is preferably situated on the support.

According to the invention, the accessory comprises an orifice (hole) which passes right through its wall and allows the "staking" technique to be applied. This technique consists in forcing molten plastic through the orifice and causing it to protrude on the opposite side to the entry of said material into the orifice, while at the same time giving the protruding plastic an appropriate shape such that it somewhat "self-forms" a plastic rivet (i.e. it forms the rivet in-situ from molten plastic from the wall of the tank). This shape is generally that of a plateau.

The orifice may have any shape. However, its cross section (in section parallel to the wall of the accessory) will generally not be constant but will vary in such a way as to create a volume (intended to be occupied by the molten plastic) of a suitable shape so as to create a non-removable mechanical connection once the said material has solidified. Furthermore, the shape of the cross section (and its variation along a plane perpendicular to the wall of the accessory) will preferably be tailored in such a way as to make it easier to force the material through the orifice, and for this to be done using an appropriate tool (insert).

It is also often advantageous from a technical standpoint to contrive for the molten plastic not to entirely fill the orifice, and for this to be achieved by means of an appropriate tool (counterform). This approach allows variations in volume of the plastic (shrinkage upon cooling, swelling upon contact with the fuel) to be accommodated without generating stresses. In this case, the plateau will preferably have a more or less oblong shape (whereas it is generally more or less circular in shape, as, incidentally, is the upper part of the orifice) or semi-oblong shape (if the flow of material through the orifice has been impeded on just one side, something which may be advantageous because the shrinkage is typically greater than the swelling in the presence of petrol), the orifice then preferably also having a more or less oblong shape. The tools mentioned hereinabove (insert, counterform in the mould) are preferably cooled so as to accelerate the actual fastening of the accessory and allow the rates of manufacture of integrated tanks (comprising at least one fixed accessory) to be increased.

In general, in the method according to the invention, recourse is had to several staking orifices. These are in fact somewhat pinpoint-like, i.e. small in size by comparison with the size of the accessory. Typically, their size is of the order of a few mm (10 mm or less).

An advantageous embodiment positions the staking orifices, for the oblong or semi-oblong versions, in the direction of the dimensional changes. These changes generally occur along lines which meet at a point located at the centre of the various orifices. In the case of (more or less) oblong orifices, one way of achieving this is to arrange the said orifices in such a way that the planes normal to the surface of the accessory at the orifices and containing the longitudinal axes thereof intersect along the same axis (i.e. along one and the same straight line which kind of constitutes an axis of symmetry of the accessory). When the longitudinal axes of the various orifices are in one and the same plane, this amounts to saying that these axes meet at a point more or less at their centre. This approach allows the accessory not to be deformed or shifted excessively with respect to the centre of the various orifices.

In the method according to the invention, the plastic of which the wall of the tank is made at the site intended for fastening the accessory is melted (which means to say in fact that it is truly subjected to fusion in the case of a semicrystalline polymer such as HDPE, but in fact means to say plasticized/softened in the case of amorphous polymers). The pasty material is then forced through the orifice of the accessory without detaching from the wall of the tank, and to solidify there. As already mentioned earlier, the size and shape of the orifice and/or of the solidified plastic are such that the accessory is mechanically fastened to the tank by at least some of the solidified plastic.

The accessory is fastened by the method according to the invention at the time of manufacture of the tank by moulding. This approach can be achieved in practice by virtue of the fact that moulding takes place starting from a split or at least two-part parison. In particular, advantageously, the stake-fastening occurs at the time of moulding of the tank by:
  thermoforming sheets;
  compressing/blow-moulding sheets (as described in the aforementioned application WO 01/60592, the content of which for this purpose is also incorporated into this application);
  blow-moulding a parison comprising at least one cut-out (as described in Patent Application EP 1110697, the content of which for this purpose is incorporated by reference into this application).

When the tank is produced by thermoforming sheets (a technique that essentially employs a mould consisting of two moulding cavities), the stake-fastening may be performed by a robot which introduces the accessory between the two parts of the mould in which the sheets are inserted and pushes it against these sheets in order to perform the stake-fastening. In this case, the tooling mentioned hereinabove (insert, counterform in the mould) can be incorporated into the robot arm.

When the tank is produced by blow-moulding or by compression/blow-moulding (techniques both of which simultaneously use a core and an actual mould proper consisting of moulding cavities), the stake-fastening is preferably performed with the aid of an insert on the mould side (so as to force the material through the orifice) and a counterform actuated by a ram on the core side (so as to deform the material which has protruded through the orifice).

A method of manufacturing the tank and of fastening the accessory by blow-moulding (in a mould comprising a core and a moulding cavity) which uses such accessories generally runs as follows positioning the accessory on the core;

initial closing of the mould (moulding cavities brought around the core);

pressing a split or at least two-part parison (or wall of a fuel tank made of plastic in the molten state) onto the moulding cavities of the mould (by blowing through the core and applying suction behind the moulding cavities);

advancing a hydraulic ram which is fastened to the core in order to perform the staking;

pricking the parison using a needle;

degassing, opening the mould, removing the core, closing the mould again and blowing in a conventional manner.

During this method, there is of course a retraction of the hydraulic ram which may occur before, during and/or after degassing. There is also a device preventing the slot or the edges of the parts of the parison from welding together during the initial closing of the mould (in order to perform the stake-fastening). To achieve this, the moulding cavities of the mould are advantageously provided with a heat regulating device that allows this region to be heated during the steps involved with the initial closing of the mould. Such a device is described for example in application FR 04.13407 in the name of the applicant company, the content of which for this purpose is incorporated by reference into this application.

In this method, the insert preferably bears a protrusion in the shape of a spike making an angle preferably of between 30 and 60°, or even 40 and 50°, and ideally of about 45°, thus encouraging the material of which the wall is made to flow through the orifice. Any abrupt transition in angle may be provided with a rounded radius so as to optimize the flow during the staking phase while at the same time preventing the barrier layer of the tank, if there is one, from rupturing.

With a view to strengthening the mechanical connection between the accessory and the wall of the tank, the counterform preferably applies pressure via the hydraulic ram not only to the accessory itself but also at least partially to the molten plastic of the wall of the tank surrounding the accessory to encourage its compaction.

The present invention also relates to a plastic fuel tank equipped with at least one (support for) accessory in direct contact with part of the wall of the tank and being equipped with several orifices of more or less oblong shape in which and over which plastic identical to that of the wall of the tank is present, these orifices being arranged in such a way that the planes normal to the surface of the accessory at the orifices and comprising the longitudinal axes of the latter intersect on one and the same axis.

In the context of the invention, the accessory may be based on a material different from the wall of the tank. Advantageously, the accessory is based on at least one material compatible or compatibilized with that of the wall of the tank (for example PA compatibilized with HDPE in particular by a suitable surface treatment or alternatively by overmoulding with an adhesive), which allows a strengthened mechanical fastening and imperviousness through chemical bonding between the two materials when the accessory comes into contact with the molten material of the tank to be fastened to the latter. Alternatively, the accessory may be made of two materials, one offering dimensional stability and the other permitting adhesion between the accessory and the wall of the tank. For example, an accessory made of a material other than HDPE (for example made of POM) can be overmoulded with HDPE.

The purpose of FIGS. 1 to 4 is to illustrate certain concrete aspects of the invention without in any way wishing to limit its scope.

Figure 2:
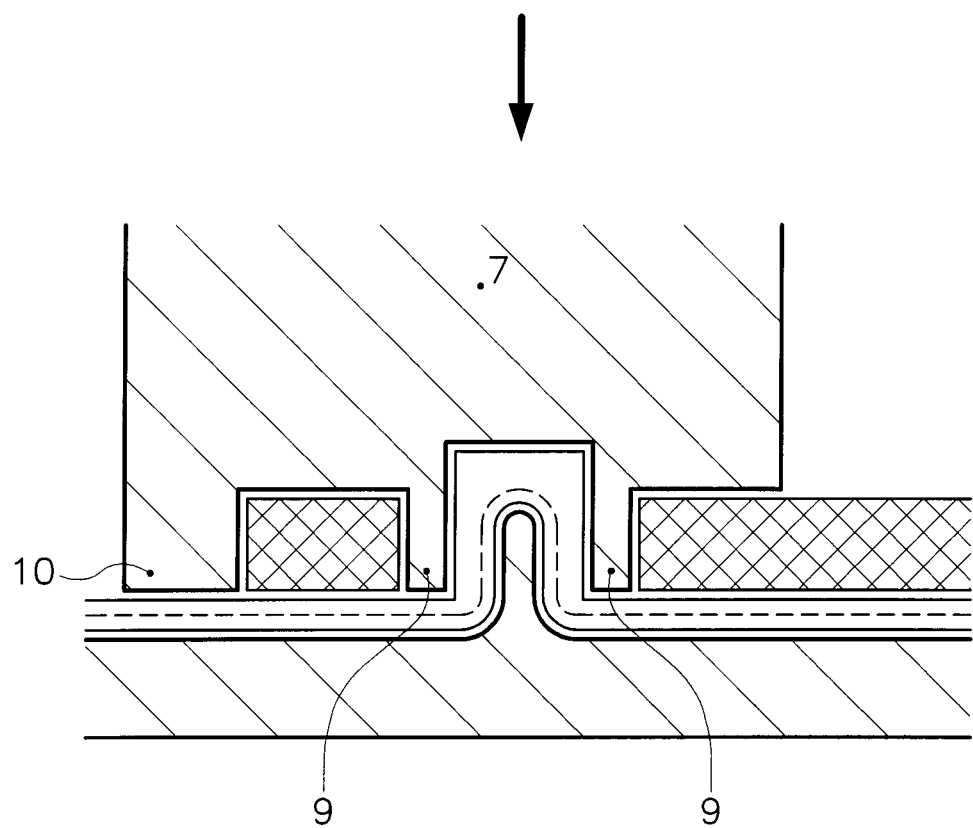

FIGS. 1 and 2 each depict a section (on a plane perpendicular to the surface of the tank at this point) through a tank to which an accessory is in the process of being stake-fastened, the said tank being in the process of being manufactured by moulding but the section confining itself to the vicinity of a staking point of given geometry.

Figure 3:
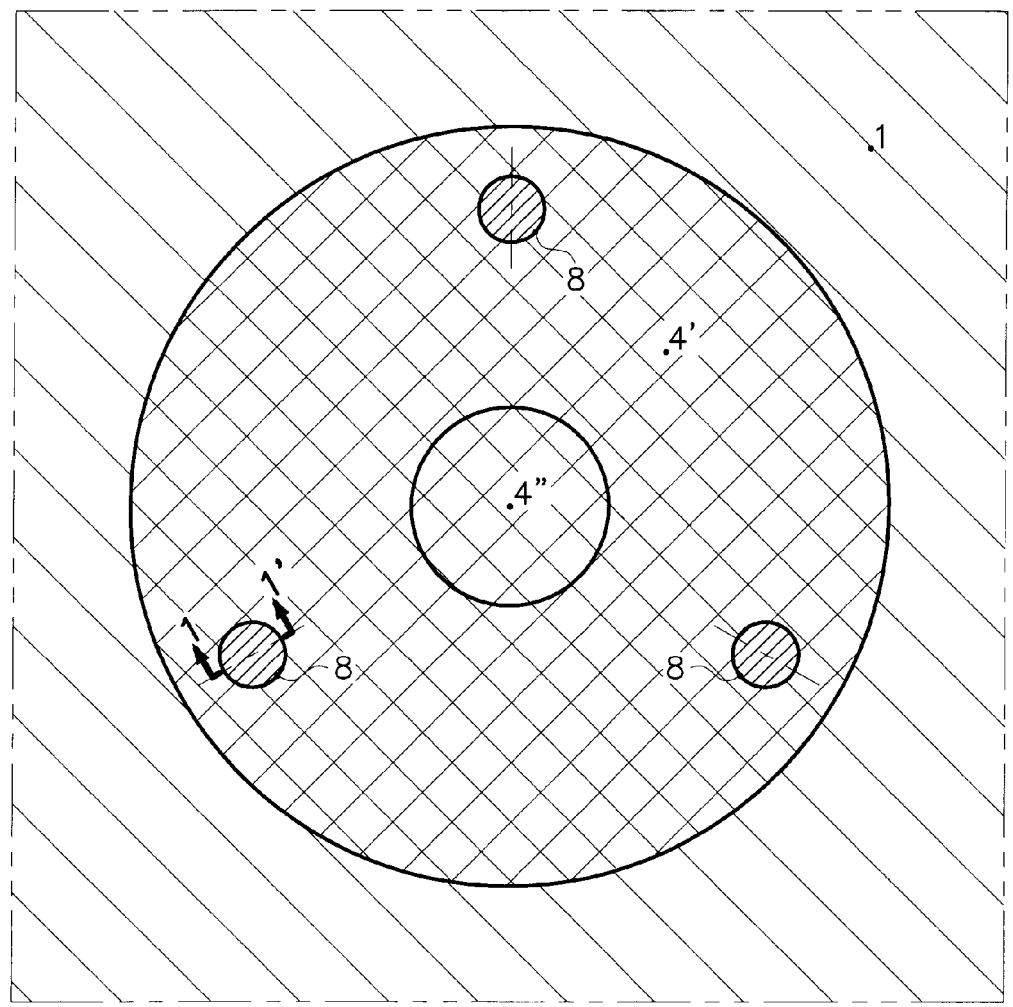
Figure 4:
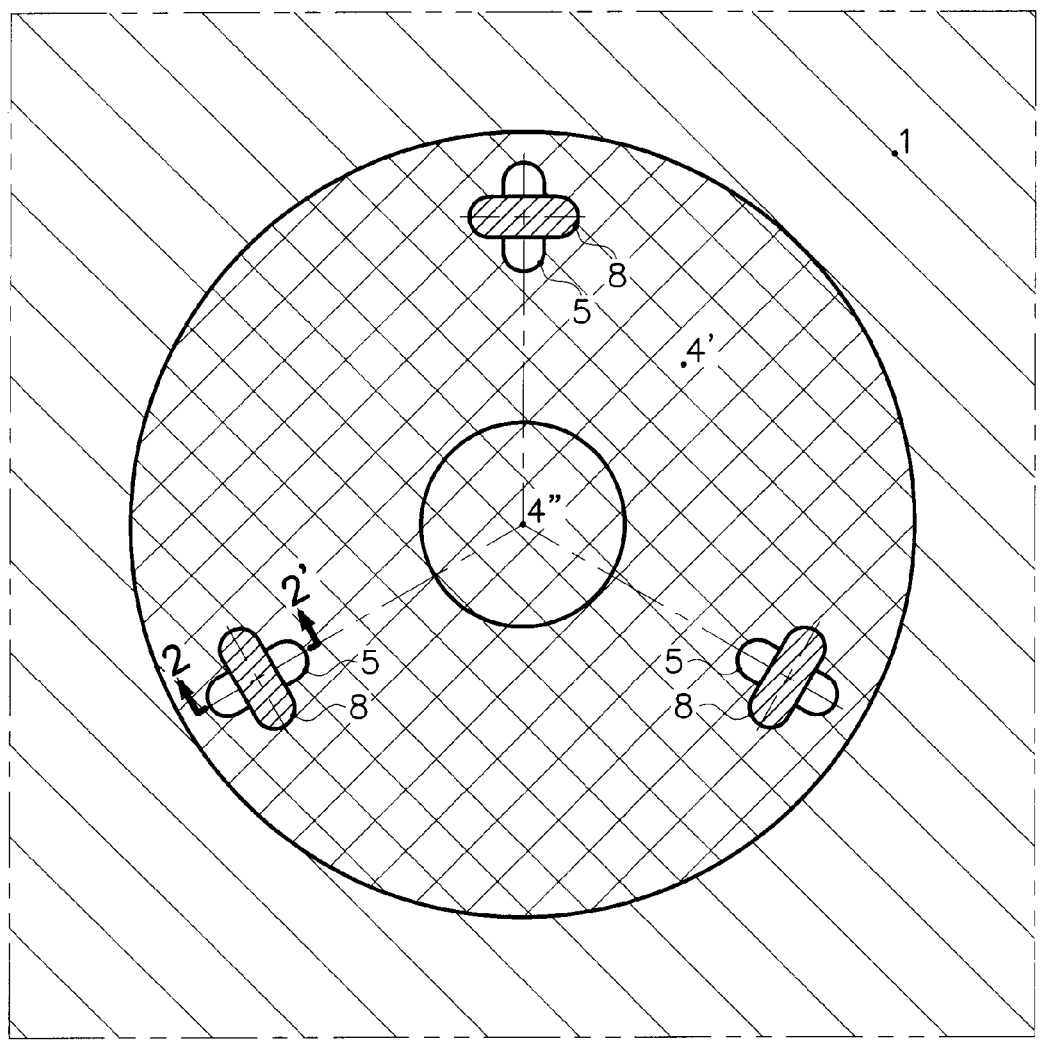

FIGS. 3 and 4 depict a view of the internal surface of the finished tank (bearing the accessory) seen in section (on planes 1-1' and 2-2' respectively) of FIGS. 1 and 2.

FIGS. 1 and 2 depict a fraction of the wall of a fuel tank (1) comprising two layers of HDPE (2,2') one on each side of a layer of EVOH (3), the said tank being in the process of being manufactured by moulding a two-part parison. An accessory (4) equipped with at least one orifice (5) is in the process of being stake-fastened to this wall (1). Constituent material of the wall of the tank (1) has been forced through this orifice (5) by means of an insert (6) fixed in the mould and has been deformed on the inside of the tank by a counterform (7) operated by a ram (not depicted but acting in the direction of the arrow) so as to form a kind of plateau (8) which overhangs the orifice (5) and prevents the accessory (4) from being removed without tearing/destroying the plateau (8). To these ends, the plateau (8) has dimensions tailored to the desired mechanical strength for the fastening of the accessory before and after contact with a fuel.

The insert (6) and the counterform (7) are cooled in order to accelerate the setting of the molten plastic around the orifice (5). The insert (6) bears a protrusion in the shape of a spike making an angle of about 45° (see FIG. 1), encouraging the constituent material of the wall (1) to flow through the orifice (5). In FIG. 2, the abrupt transitions in angle have been given a rounded radius to optimize the flow during the stake-fastening phase while at the same time avoiding rupturing the layer of EVOH.

In the case illustrated in FIG. 1, the plateau (8) is circular and plastic occupies the entire orifice (5).

In the case illustrated in FIG. 2, the circular plateau (8) has been deformed (rendered oblong) by an appropriate relief (9) on the counterform (7), this being so as to absorb the dimensional changes introduced by shrinkage during cooling of the tank and expansion by swelling upon contact with the fuel. In order to ensure good filling of this plateau (8), the counterform (7) has been designed to overhang the accessory (4) (see part (10) in the figure) and press against the wall of the tank (1) in the vicinity of the accessory (4). This approach makes it possible to increase the internal pressure at the plateau (8) and therefore improve the compacting in the plateau (8).

The respective shapes of the plateaus (8) in the two cases are illustrated in FIGS. 3 and 4 respectively, in an overall view of the interior surface of the tank bearing the accessory. In FIG. 3, the orifice (5), which is not visible, is circular and in FIG. 4, the orifice is oblong.

The accessory (4) illustrated in these figures comprises a support (4') which allows for ease of staking (illustrated in the form of 3-point staking in these figures) and the accessory proper (4") secured to it. It can be seen in FIG. 4 that the axes (see dotted lines) of the oblong orifices (5) meet at the centre of the support of the accessory (4') which is more or less flat.

The invention claimed is:

1. A method for stake-fastening an accessory onto a plastic fuel tank, whereby:

the accessory is equipped with at least one orifice which passes completely through the accessory;

at least some of the plastic of which the wall of the plastic fuel tank is made is melted to form molten plastic;

some of the molten plastic is compressed against the orifice of said accessory such that the molten plastic flows through the orifice without becoming detached from the remainder of the molten plastic thereby forming protruding molten plastic; and the protruding molten plastic is shaped to provide a self-formed plastic rivet, and is left to form solidified plastic;

wherein the accessory has an indentation on an outer portion of the accessory and around the orifice, the indentation around the orifice has a variable cross section shaped to ease flow of the molten plastic into the orifice as the molten plastic is compressed against the accessory and into the orifice, the size and shape of the orifice and/or of the solidified plastic are such that the accessory is mechanically fastened to the tank by at least some of the solidified plastic, the stake-fastening of the accessory occurs at the time of manufacture of the tank, and wherein said tank is manufactured by the blow-moulding of a split or at least a two-part parison using a mould comprising a core on which the accessory has been positioned and moulding cavities, said stake-fastening being performed during an initial closing of the mould by bringing said moulding cavities around the core, pressing the parison onto the moulding cavities, and preventing the slot or the edges of the parts of the parison from welding together, the mould being opened to remove the core before closing the mould again to blow the tank.

2. The method according to claim 1, wherein the tank comprises high density polyethylene (HDPE) and a layer of a copolymer of ethylene and partially hydrolysed vinyl acetate (EVOH), or is subjected to a surface treatment in order to render it impermeable to the fuel.

3. The method according to claim 1, wherein the accessory comprises a support which is either equipped with a fastener for one or several functional devices of said fuel tank, or bears one or several such devices directly, and wherein the orifice is situated on said support.

4. The method according to claim 1, wherein said molten plastic does not entirely fill the orifice.

5. The method according to claim 4, wherein the orifice is oblong and the molten plastic is shaped into an oblong or semi-oblong plateau.

6. The method according to claim 5, wherein the accessory comprises a support equipped with several oblong orifices associated with several oblong or semi-oblong plateaus, and wherein these are arranged in such a way that the longitudinal axes of the orifices meet at a point more or less at the centre of the support.

7. The method according to claim 1, wherein the stake-fastening comprises an insert on the mould side to compress the molten plastic against the orifice and a counterform actuated by a ram on the core side.

8. The method according to claim 7, said method comprising:

positioning the accessory on the core;

initially closing said mould so that said moulding cavities are brought around the core;

pressing the split or at least a two-part parison onto the moulding cavities of the mould by blowing through the core and applying suction behind the moulding cavities;

advancing the ram in order to perform the staking;

pricking the parison using a needle; and degassing, opening the mould, removing the core, closing said mould and blowing.

9. The method according to claim 7, wherein the insert bears a protrusion in the shape of a spike with rounded corners, wherein an angle of the side of the spike with respect to the surface of the mould side is about 45°.

10. The method according to claim 7, wherein the counterform applies pressure via the ram, which is a hydraulic ram, either to the accessory only or also at least partially to the molten plastic of the wall of the tank surrounding the accessory.

* * * * *